United States Patent [19]

Zanchetta

[11] Patent Number: 5,011,640
[45] Date of Patent: Apr. 30, 1991

[54] PROCESS FOR SPHERONIZATION AND DEVICE FOR IMPLEMENTING SAID PROCESS

[75] Inventor: Aldo Zanchetta, Lucca, Italy

[73] Assignee: Zanchetta & C. s.r.l., Lucca, Italy

[21] Appl. No.: 486,772

[22] Filed: Mar. 1, 1990

[30] Foreign Application Priority Data

Mar. 1, 1989 [IT] Italy ................................ 9356 A/89

[51] Int. Cl.⁵ .............................................. B29B 9/08
[52] U.S. Cl. .................... 264/69; 23/313 R; 264/101; 264/112; 264/117; 425/222; 427/212
[58] Field of Search ................ 264/15, 117, 69, 112, 264/101; 23/313 R, 313 P; 427/212, 213; 425/222

[56] References Cited

U.S. PATENT DOCUMENTS

| | | | |
|---|---|---|---|
| Re. 27,214 | 11/1971 | Nakahara | 264/15 |
| 3,400,185 | 9/1968 | Kohnle et al. | 264/117 |
| 3,671,296 | 6/1972 | Funakoshi et al. | 427/212 |
| 3,687,717 | 8/1972 | Philip | 427/213 |
| 3,872,200 | 3/1975 | Tokito et al. | 264/117 X |
| 4,157,371 | 6/1979 | Paulson et al. | 264/114 |
| 4,772,434 | 9/1988 | Myers | 264/8 |
| 4,786,506 | 11/1988 | Fontanelli | 424/470 |

Primary Examiner—Mary Lynn Theisen
Attorney, Agent, or Firm—McGlew & Tuttle

[57] ABSTRACT

One or more powders are placed in a leaktight vessel (12) having a substantially vertical axis and comprising a bottom blade rotating about an axis parallel to the axis of said vessel, and a spheronizing tool (28) having a substantially discoidal rotating form; said powders are mutually mixed by means of the rotation of said bottom blade, and a binder solution is added thereto. The composition of mixed powders thus added to is spheronized by immersing said spheronizing tool (28) in said composition and causing it to rotate simultaneously with said blade (18).

15 Claims, 4 Drawing Sheets

PROCESS FOR SPHERONIZATION AND DEVICE FOR IMPLEMENTING SAID PROCESS

FIELD OF THE INVENTION

The invention relates to a process of spheronization, that is to say, to a process for the production of bulk material in the form of small-diameter spheres from pulverulent materials.

BACKGROUND OF THE INVENTION

In various technological fields, and in particular in the pharmaceutical field, it is necessary to produce bulk material in the form of small spheres from one or more materials in powder form. This type of processing will be referred to below by the generic term "spheronization". In the applications in the pharmaceutical field, these products comprise drugs or medicaments to which excipients are added; these products in powder form are to be amalgamated and then, with the aid of suitable binders, reduced to small spheres characterized by clearly determined physical and chemical properties, particularly in respect of the percentage of drug in the total mass of the individual sphere. In this type of processing, technical problems are encountered which are familiar to those skilled in the art. Particularly difficult problems are those connected with the dosage of the components and binders, with the dimensions of the spheres obtained at the end of processing and hence with the yield in dimensional terms, and with the contamination of the product and/or of the environment during processing.

Various processes of spheronization are currently employed, and possess a number of disadvantages. According to one of these known methods, the material or materials in powder form (for example, a drug and an excipient) are mixed and a liquid, for example water or a mixture of water and alcohol, is added thereto in order to form a moist composition which is then extruded. The extruded material is then placed in a spheronizer which possesses a plate rotating at a velocity of between 100 and 1000 revolutions per minute. The surface of the plate is fashioned to cause the deformation of the extruded material and the formation of the spheres. This method possesses the disadvantage that the material has to be mixed and amalgamated with the liquid, then passed to the extruder, and the semi-processed extrudate has to be passed to the spheronizer. These transfers necessarily entail a loss of material and are responsible for contamination both of the material by the atmosphere and of the atmosphere by the material being processed. Furthermore, the spheronized material has to be removed from the spheronizer and placed in a suitable apparatus in order to be dried. This entails further losses of material and risks of contamination.

According to another known method, the spheres are produced in a fluidized bed within a suitable vessel into which is introduced, from the bottom, a gas having suitable physical and chemical properties. With this method, extensive losses of material are encountered owing to the friction between the particles being formed, with the production of powders which are highly contaminating.

SUMMARY AND OBJECTS OF THE INVENTION

The subject of the invention is a method of spheronization which does not possess the abovementioned disadvantages and which, in particular, makes it possible to carry out all the stages of processing within a single vessel, without the necessity to transfer the semi-finished product from one apparatus to another, thus avoiding the losses of material and contamination.

Substantially, the process of spheronization according to the invention is a process wherein: one or more powders are placed in a leaktight vessel having a substantially vertical axis and comprising a bottom blade rotating about an axis parallel to the axis of said vessel, and a single or multiple spheronizing tool having a substantially discoidal rotating form; wherein said powders are mutually mixed by means of the rotation of said bottom blade, a binder solution being added thereto; and wherein the composition of powders to which binder solution has been added is spheronized by immersing said spheronizing tool in said composition and causing it to rotate simultaneously with said blade. With this process, the mixing of the powders, the addition of the binder to form a composition to be spheronized and the spheronization take place in a single leaktight vessel without losses of product and without contamination.

It has further been found that the dimensions of the spheres obtained are much more regular than those obtained with the traditional methods. In particular, the dimensional yield, that is to say the percentage of spheres which fall within a range of tolerance on either side of the nominal dimension required, in the case of the process according to the present invention, is equal to or greater than 90%, whereas in the traditional methods it fluctuates around 70-75%. This represents improved utilization of the starting materials and hence reduced production costs.

According to the invention, it is possible to arrange that in the final stage of the spheronization treatment the spheronized material is dried by fluidization by means of introduction of gas or of a mixture of gases into the lower portion of said vessel. The pressure maintained in the vessel during drying may be atmospheric pressure or a lower pressure. In particular cases, very high vacuum states may also be used, even in the absence of a flow of gas. During the drying stage, the interior of the vessel may be maintained at a more or less elevated temperature by means of the circulation of a heat-transfer fluid in an air space or jacket surrounding said vessel. When drying is carried out within the vessel in which the spheronization takes place, the transfer of the spheronized material from the spheronizer to the drying device is also avoided, further reducing the losses and the contamination risks.

For drying by means of hot gases, it is possible to employ an inert gas such as nitrogen or the like, or alternatively a mixture of gases, for example air, suitably treated if appropriate to obtain the necessary physical characteristics of temperature and humidity.

In specific cases the spheronized product, that is to say the spheres, must be covered by a coating layer. This operation is called "coating" and is carried out, in accordance with known methods, in suitable apparatuses after the spheronization and, if appropriate, drying, a solution containing the substances which are to constitute the coating layer being atomized in a suitable chamber. Simultaneously, a gas capable of causing the drying of the material is introduced into the chamber, and said material gradually becomes deposited on the surfaces of the spheres. According to the process forming the subject of the present invention, the "coating"

stages may likewise be carried out within the same vessel in which the spheronization and drying take place, it being possible to provide one or more nozzles for the atomization of the coating solution.

The vessel in which the spheronization takes place may be subjected, during one or more stages of the processing, to an oscillatory movement about a horizontal axis. Conversely, all the operations may also be performed with the vessel stationary.

A further subject of the invention is a device for carrying out the spheronization according to the process described above. The device comprises: a vessel having a vertical axis, which vessel is fixed or oscillating about a horizontal axis; adjacent to the bottom of said vessel, a rotating bottom blade; associated with said vessel, means for blowing in and aspirating gas or mixtures of gases into and from the composition being processed; and a rotating discoidal spheronizing tool capable of being immersed in the composition being processed.

In a practical form of embodiment, said means for introducing gas comprise porous wall portions at the bottom of said vessel, the introduction of gas or mixtures of gas determining the fluidization of the material contained in said vessel. The means of introducing gas may be employed both for drying the spheronized product and for carrying out the "coating" of the spheronized material, with simultaneous introduction, through a suitable atomization nozzle, of the solution containing the substances which are to form the coating.

In a possible form of an embodiment, the spheronizing tool comprises at least one rotating discoidal member, or a member with a disk and comprising a plurality of appendages extending outside the plane of said discoidal member. It is also possible to employ tools having multiple and coaxial disks. The discoidal member or members of the tool may have a smooth edge or an edge possessing a plurality of teeth, projections or indentations for greater transmission of energy to the product.

The spheronizing tool may be mounted on a fixed or telescopic arm in order to be immersed in and removed from the composition being processed. The axis of the spheronizing tool may be substantially parallel to the axis of the bottom blade, and the arm carrying said tool may be mounted on the upper closure portion of said vessel.

BRIEF DESCRIPTION OF THE DRAWINGS

The invention will be better understood with reference to the description and the attached drawing, which shows a non-limiting practical exemplary embodiment of said invention. In the drawing.

DETAILED DESCRIPTION OF THE PREFERRED EMBODIMENTS

Figure 1:
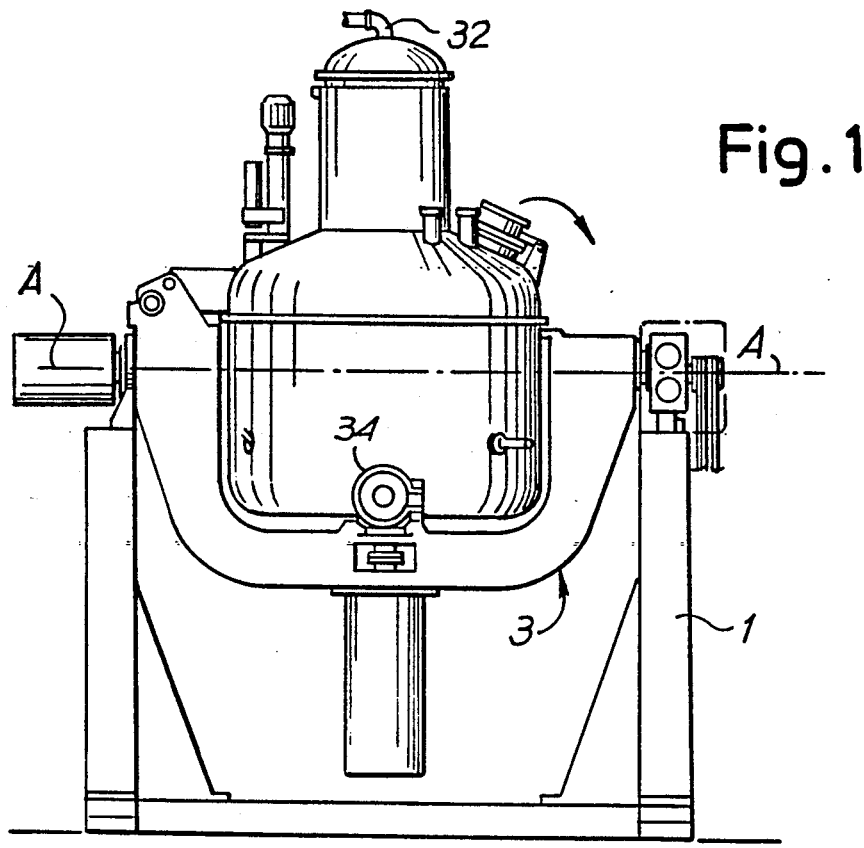
FIG. 1 shows a frontal view of the device.
Figure 2:
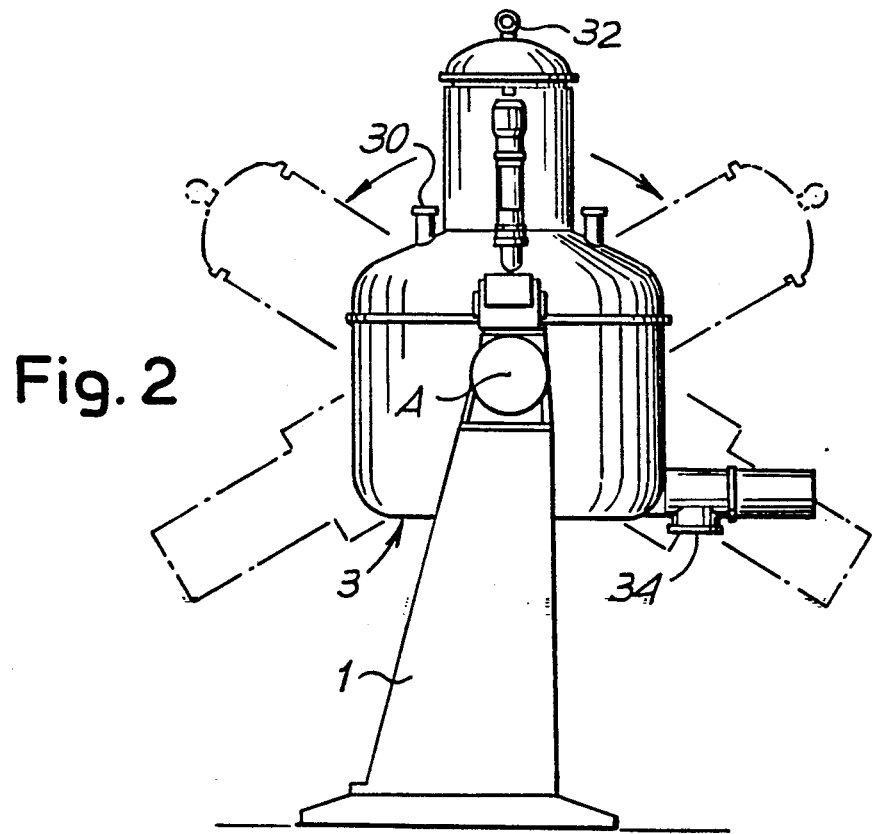
FIG. 2 shows a lateral view of the device in FIG. 1.

In accordance with what is shown in the attached drawing, there is articulated on a support structure 1, along a horizontal axis A—A, an apparatus 3 which comprises the vessel for the material being processed. The apparatus 3 comprises, in particular, a housing 5 on which is mounted a hub 7 for a rotating spindle 9 driven by a hydraulic motor or by an equivalent motor means. The spindle 9 extends through the base 12A of a vessel 12 which is of substantially cylindrical form, having a closure lid 14 which can provide a leaktight closure for processing under vacuum and/or in a controlled atmosphere, for example an inert atmosphere. The lid 14 may be equipped with means for the introduction of the materials to be added during processing. The vessel 12 and its apparatus 3 can be caused to oscillate about the axis A—A through amplitudes of around 180° in a symmetrical manner relative to a vertical half-plane containing the axis A—A, as shown in particular in FIG. 2. The control means may follow the oscillation of the apparatus 3.

Figure 3:
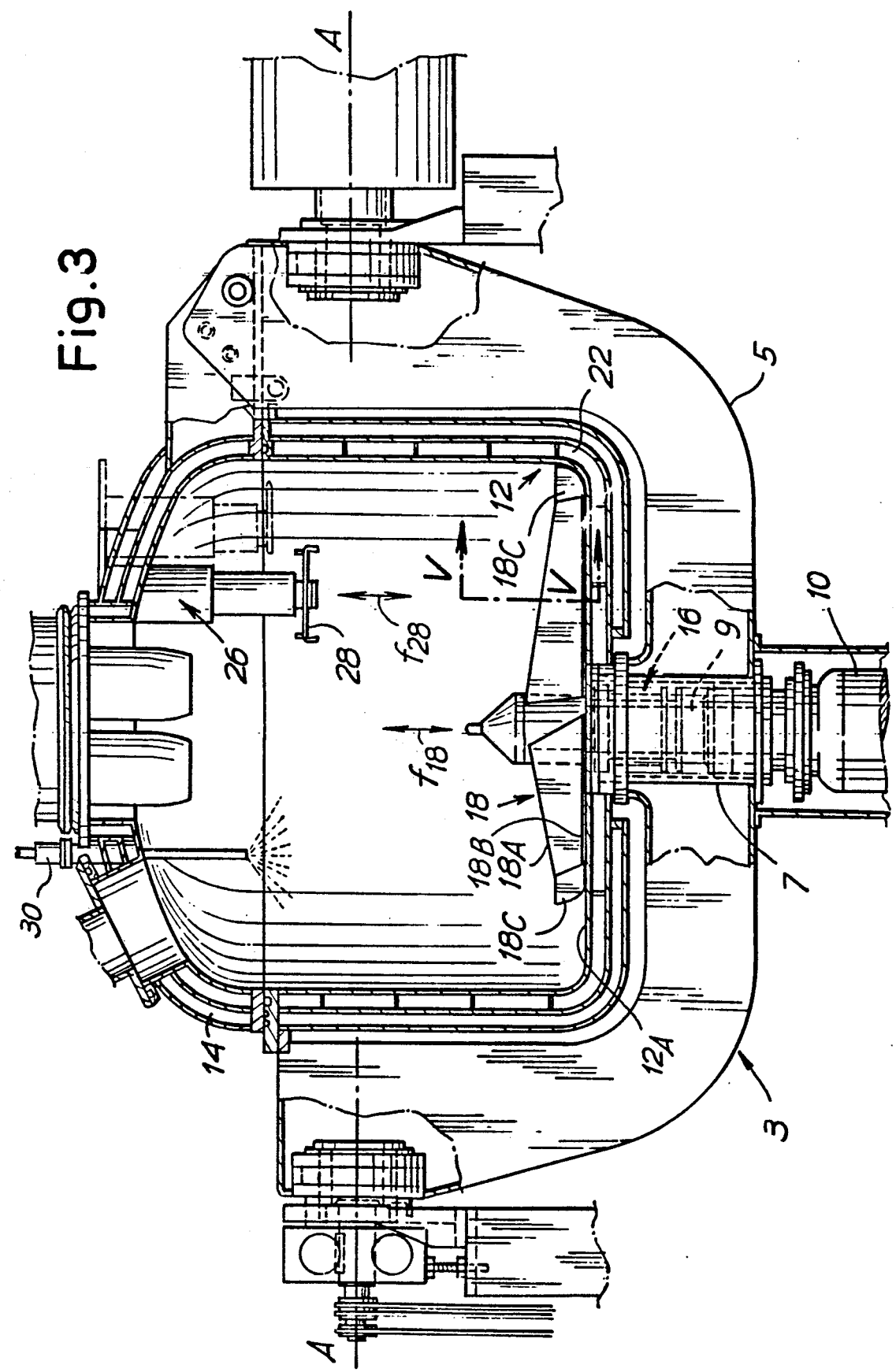
FIG. 3 shows a section through the device of FIGS. 1 and 2 in a plane passing through the axis of the vessel.
Figure 5:
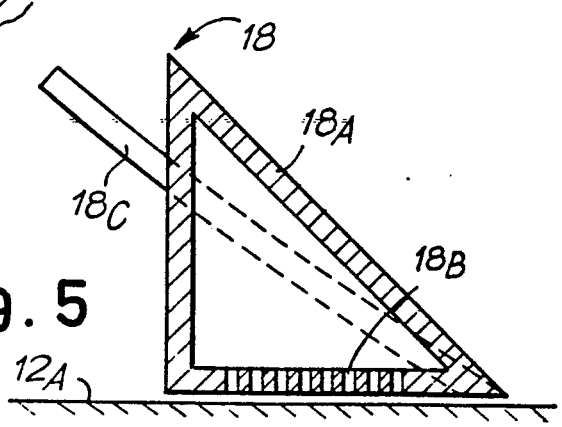
FIG. 5 shows a section through the blade on the line V—V in FIG. 3.

The spindle 9 passes through the base 12A of the vessel 12 and possesses sealing means generically designated 16, and within the vessel, in the vicinity of the base 12A, said spindle actuates a rotating blade generically designated 18. This blade possesses, in the solution according to FIG. 3, a hollow main part 18A having a lower or lateral porous plate 18B which closely adjoins the base 12A, the part 18A having a substantially triangular section with various inclinations, depending on the particular case; the blade terminates in end parts 18C which are of a spade shape, as shown in FIG. 5.

Figure 4:
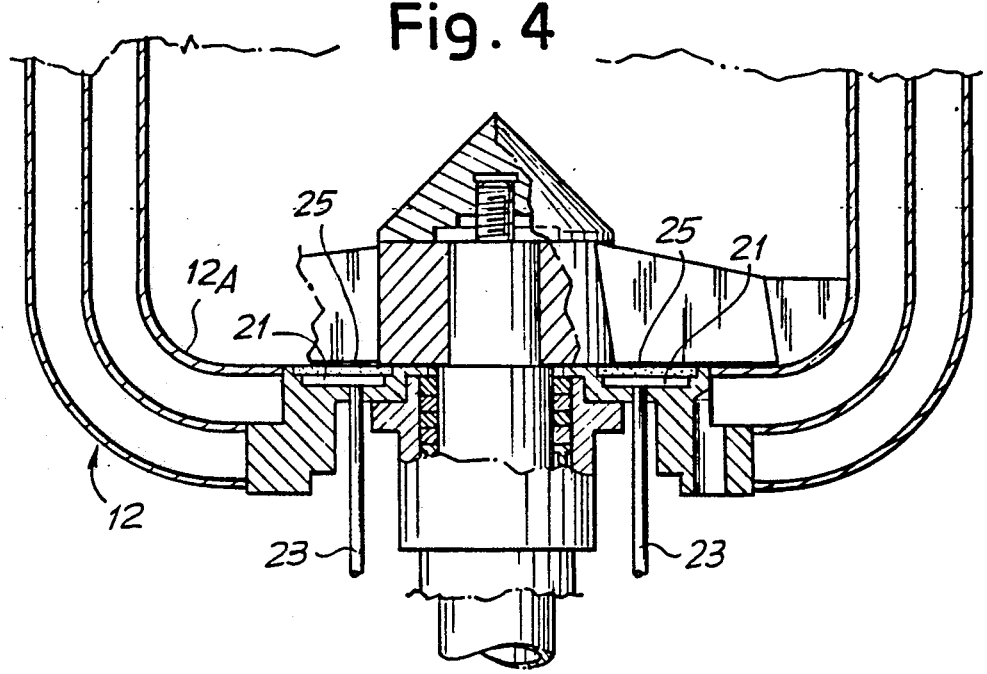
FIGS. 4 and 4A show, diagrammatically, a detail of a modified embodiment of the device and an enlarged detail.
Figure 4A:
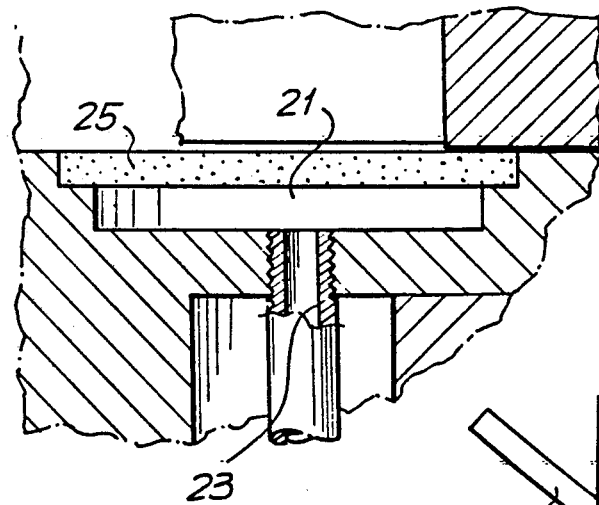

Known means are provided, in the region of the sealing zone, for the introduction of an inert gas such as nitrogen, of air or of another suitable gas or mixture of gases. The gas is introduced through a manifold into the body of the blade, which is hollow, and is caused to issue from the porous portions 18B thereof for the purposes specified below. Conversely, as shown in FIGS. 4 and 4A, the base 12A of the vessel 12 may possess an annular channel or other cavity 21 in which, through one or more inlet ducts 23, the gas or mixture of gases is introduced and then penetrates into the vessel 12 through a porous plate 25.

The vessel 12 is provided with air spaces 22 along its own walls for a heating, cooling or other temperature-regulating fluid for the requirements of the processing operations to be carried out.

Within the vessel 12, on a telescopic arm 26 carried by the lid 14, is arranged a spheronizer tool 28 rotating about an axis which, in the example of the drawing, is parallel to the axis of the blade 18, but which could be otherwise oriented.

The arm 26 may be telescopically extended or shortened in order to displace the tool 28 in accordance with the double arrow f28 so as to immerse it in the composition being processed or extracted therefrom. The blade 18, likewise, may be axially mobile in accordance with f18, so that its action can affect the entire mass of material being processed.

On the lid 14, or in another suitable position on the vessel 12, are incorporated atomizer nozzles 30 for the introduction of the liquid solutions required during the treatment of the material being processed, and gas inlet and/or aspiration lines 32. The vessel may be discharged by means of a lateral discharge valve 34 arranged in the vicinity of the base thereof.

Figure 6:
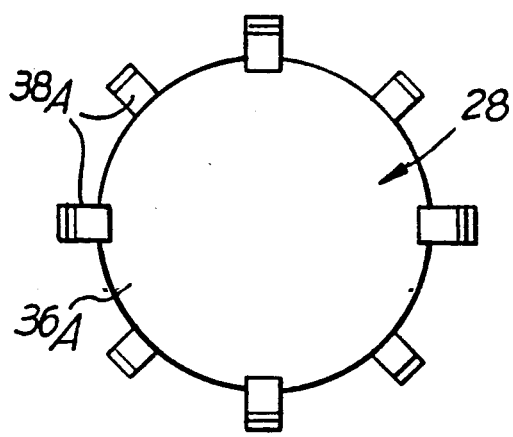
FIGS. 6 to 11 show, in plan view and in lateral view, possible embodiments of the spheronizing tool.
Figure 8:
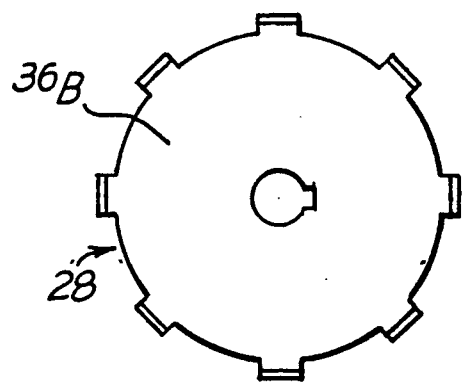
Figure 7:
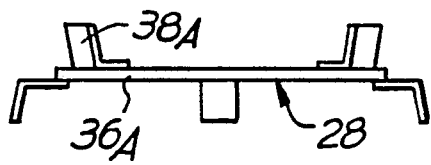
Figure 9:
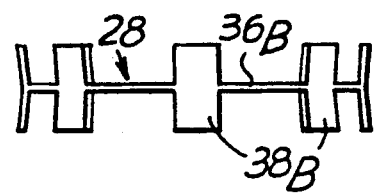
Figure 10:
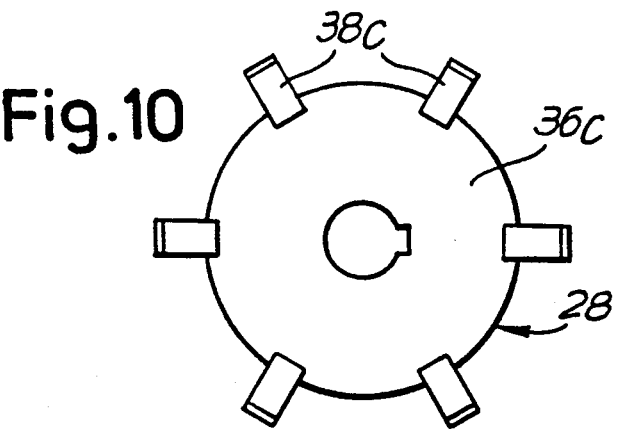
Figure 11:
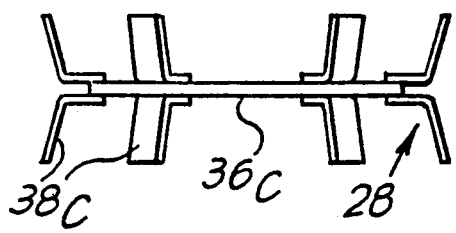

FIGS. 6 and 11 show, in plan view and in lateral view, three possible configurations of a discoidal member forming part of the spheronizer tool 28. Said tool may comprise one or more disk members which can assume one of the configurations designated 36A, 36B, 36C, and which can be provided with appendages 38A, 38B, 38C respectively, the number, dimensions and disposition of which may vary as a function of the characteristics of the material to be spheronized and of the required product. The spheronizer tool 28 may comprise one or more of these discoidal members, mounted coaxially and being mutually equal or different.

With the device shown, the process of spheronization according to the invention may be carried out in the manner described below.

The process of spheronization provides a first stage of introduction of the pulverulent components into the vessel 12 and mixing thereof by means of the rotation of the blade 18 which, in this stage, can be displaced in accordance with the double arrow f18 to affect the entire mass of powders. During the mixing stage, or subsequently thereto, there is introduced into the vessel 12, through the appropriate nozzles 30, a binder solution capable of permitting the formation of spherical granules from the material in powder form.

Spheronization takes place as a result of the simultaneous rotation of the blade 18 and of the discoidal spheronizer tool 28 which, to this end, is lowered until it penetrates into the composition being processed. The quantity of material introduced into the vessel 12 is such that, within said vessel, said material is arranged in the form of a ring about the axis of the blade 18, leaving the central zone virtually free. The spheronizer tool 18 is positioned in a manner such as to operate in the annular zone in which the material is situated.

During these operations, it is possible to control both the temperature conditions and the composition of the atmosphere within the vessel 12. The air spaces 22 and the gas and/or air introduction means are provided within said vessel 12 for this purpose.

The dimensions of the spheres which are obtained can be easily controlled by regulating the speed of rotation of the blade and of the spheronizer tool, and also the processing time and the quantity of wetting solution or binder employed. In particular, an increase in the speeds of rotation and/or in the processing times and/or in the quantity of binder solution entails an increase in the dimensions of the final product.

Once the spheronization stage per se is finished, without it being necessary to open the vessel or to move the contents thereof, a gas or a mixture of gases with suitable chemical and physical characteristics, and in particular with a suitable moisture content and at an appropriate temperature, is blown in from the bottom of said vessel (through the porous plates 18B and/or through the porous plates 21) in order to effect the drying of the product. This may take place with stopping, or alternatively with continuation, of the rotary movement of the blade 18 and of the spheronizer tool 28. Drying may also take place under reduced pressure, that is to say with the optional presence of a vacuum. Furthermore, during drying, it is possible to arrange for the circulation of a heat-transfer fluid (for example hot water) in the air spaces surrounding the vessel.

In the case of production of coated spheres, the "coating" stage may follow at this point (still in the same vessel 12 and without it being necessary to move the material) by introducing the solution containing the coating substances and simultaneously or subsequently introducing gas or mixtures of gases for drying. The solution containing the coating substances may be introduced through the same spraying nozzles 30, or other similar devices.

It is understood that the drawing shows only an exemplary embodiment, given solely by way of a practical demonstration of the invention, said invention being capable of variation in respect of shapes and arrangements without thereby departing from the scope of the idea underlying the said invention. Similarly, the process according to the invention may be subjected to variations and modifications with respect to what has been described by way of example.

I claim:

1. A process of spheronization, that is to say of production of ;bulk material in the form of small-diameter spheres from pulverulent materials, wherein: one or more powders are placed in a leaktight vessel having a substantially vertical axis and comprising a bottom blade rotating about an axis parallel to the axis of said vessel, and a single or multiple spheronizing rotating tool having a substantially discoidal form; wherein said powders are mutually mixed by means of the rotation of said bottom blade, a binder solution being added thereto; and wherein the composition of powders and binder solution is spheronized by immersing said spheronizing tool in said composition and causing it to rotate simultaneously with said blade.

2. The process of spheronization as claimed in claim 1, wherein in the final stage of the spheronization treatment the spheronized material is dried by fluidization by means of introduction of gas or of a mixture of gases into the lower portion of said vessel.

3. The process of spheronization as claimed in claim 2, wherein said gas is an inert gas.

4. The process of spheronization as claimed in claim 2, wherein the said mixture of gases is air.

5. The process of spheronization as claimed in claim 1, wherein, in the final stage of the spheronization treatment, the spheronized material is dried in vacuo.

6. The process of spheronization as claimed in claim 1, wherein, at the end of the spheronization, a solution capable of forming a coating on the spheronized material is introduced into the vessel, the spheronized material being dried simultaneously with or subsequently to the introduction of said solution.

7. The process of spheronization as claimed in claim 1, wherein the vessel in which the spheronization takes place is subjected to an oscillating movement about a horizontal axis.

8. The process of spheronization as claimed in claim 1, wherein, during one or more of the stages of said process, the temperature in said vessel is controlled by means of a heat-transfer fluid circulating in air spaces surrounding said vessel.

9. A device for spheronization, that is to say for the production of bulk material in the form of small-diameter spheres from pulverulent material, comprising: a vessel having a vertical axis; adjacent to the bottom of said vessel, a rotating bottom blade; associated with said vessel, gas introducing means for blowing in and aspirating gas or mixtures of gases into and from the composition being processed including portions of porous wall at the bottom of said vessel, the introduction of gas or mixture of gases providing a fluidization of the material contained in said vessel; and a rotating discoidal spheronizing tool capable of being immersed in the composition being processed.

10. The device as claimed in claim 9, wherein said spheronizer tool comprises at least one rotating discoidal member.

11. The device as claimed in claim 10, wherein said spheronizer tool comprises at least one rotating discoidal member possessing a plurality of appendages extending outside the plane of said discoidal member.

12. The device as claimed in claim 9, wherein said spheronizer tool is carried on a telescopic arm to be immersed in and extracted from the composition being processed.

13. The device as claimed in claim 9, wherein said tool rotates about an axis which is substantially parallel to the axis of said bottom blade.

14. The device as claimed in claim 9, wherein said arm carrying said spheronizer tool is mounted on the upper closure portion of said vessel.

15. The device as claimed in claim 9, comprising nozzle means for introducing into said vessel a product suitable for forming a coating on the spheres obtained.

* * * * *